US 9,977,995 B2

(12) United States Patent
Huang

(10) Patent No.: US 9,977,995 B2
(45) Date of Patent: May 22, 2018

(54) IMAGE CLUSTERING METHOD, IMAGE CLUSTERING SYSTEM, AND IMAGE CLUSTERING SERVER

(71) Applicant: TENCENT TECHNOLOGY (SHENZHEN) COMPANY LIMITED, Shenzhen, Guangdong (CN)

(72) Inventor: Pipei Huang, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 29 days.

(21) Appl. No.: 15/151,899

(22) Filed: May 11, 2016

(65) Prior Publication Data
US 2016/0253577 A1    Sep. 1, 2016

Related U.S. Application Data

(63) Continuation of application No. PCT/CN2014/091135, filed on Nov. 14, 2014.

(30) Foreign Application Priority Data

Nov. 14, 2013 (CN) .......................... 2013 1 0567574

(51) Int. Cl.
*G06K 9/62* (2006.01)
*G06Q 30/02* (2012.01)
(Continued)

(52) U.S. Cl.
CPC ......... *G06K 9/6218* (2013.01); *G06K 9/2072* (2013.01); *G06K 9/52* (2013.01);
(Continued)

(58) Field of Classification Search
CPC ...... G06K 9/6218; G06K 9/2072; G06K 9/52; G06K 9/6215; G06K 9/6232; G06K 9/6268; G06Q 30/0277
See application file for complete search history.

(56) References Cited

U.S. PATENT DOCUMENTS 8,165,414 B1    4/2012 Yagnik
9,084,028 B2 *  7/2015 Cho .................. H04N 21/4722
(Continued)

FOREIGN PATENT DOCUMENTS

CN    101162470 A    4/2008
CN    101710334 A    5/2010
(Continued)

OTHER PUBLICATIONS

International Search Report and Written Opinion of the ISA for PCT/CN2014/091135, ISA/CN, Haidian District, Beijing, dated Mar. 4, 2015.
(Continued)

*Primary Examiner* — David F Dunphy
(74) *Attorney, Agent, or Firm* — Harness, Dickey & Pierce, P.L.C.

(57) ABSTRACT

An image clustering method, an image clustering system, and an image clustering server are provided. The method includes: extracting a GIST feature of a first image and a GIST feature of a second image; obtaining an image fingerprint of the first image based on the GIST feature of the first image, and obtaining an image fingerprint of the second image based on the GIST feature of the second image; calculating a similarity between the first image and the second image, based on the image fingerprint of the first image and the image fingerprint of the second image; and determining whether the similarity between the first image and the second image is larger than a predetermined similarity threshold, and classifying the two image as a same category of image if the similarity between the first image and the second image is larger than the predetermined similarity threshold.

12 Claims, 8 Drawing Sheets

(51) Int. Cl.
*G06K 9/20* (2006.01)
*G06K 9/52* (2006.01)

(52) U.S. Cl.
CPC ......... *G06K 9/6215* (2013.01); *G06K 9/6232* (2013.01); *G06K 9/6268* (2013.01); *G06Q 30/0277* (2013.01)

(56) References Cited

U.S. PATENT DOCUMENTS

| | | |
|---|---|---|
| 2011/0238698 A1 | 9/2011 | Asikainen et al. |
| 2012/0121194 A1 | 5/2012 | Yagnik |
| 2013/0142433 A1 | 6/2013 | Park et al. |
| 2013/0202205 A1* | 8/2013 | Liu ................... G06F 17/30268 382/170 |
| 2014/0304278 A1* | 10/2014 | Kleiman ........... G06F 17/30277 707/749 |

FOREIGN PATENT DOCUMENTS

| | | |
|---|---|---|
| CN | 103092861 A | 5/2013 |
| CN | 103283247 A | 9/2013 |
| CN | 103294676 A | 9/2013 |
| CN | 103324650 A | 9/2013 |
| CN | 103365879 A | 10/2013 |
| CN | 104090882 A | 10/2014 |
| WO | WO-2015070798 A1 | 5/2015 |

OTHER PUBLICATIONS

First Chinese Office Action regarding Application No. 201310567574.2 dated Feb. 10, 2015. English translation provided by Unitalen Attorneys at Law.

Second Chinese Office Action regarding Application No. 201310567574.2 dated Jun. 5, 2015. English translation provided by Unitalen Attorneys at Law.

* cited by examiner

IMAGE CLUSTERING METHOD, IMAGE CLUSTERING SYSTEM, AND IMAGE CLUSTERING SERVER

CROSS REFERENCE TO RELATED APPLICATION

This application is a continuation application of International Application No. PCT/CN2014/091135, titled "IMAGE CLUSTERING METHOD, IMAGE CLUSTERING SYSTEM, AND IMAGE CLUSTERING SERVER", filed on Nov. 14, 2014, which claims priority to Chinese patent application No. 201310567574.2 titled "IMAGE CLUSTERING METHOD, IMAGE CLUSTERING SYSTEM, AND IMAGE CLUSTERING SERVER" and filed with the State Intellectual Property Office on Nov. 14, 2013 which is incorporated herein by reference in its entirety.

FIELD

The present invention relates to the field of Internet technology, and in particular to an image clustering method, an image clustering system and an image clustering server.

BACKGROUND

Image clustering refers to analyzing images, extracting feature vectors of the images, and clustering the images based on the feature vector and a matching algorithm. For example, in advertisement recommendation, there may be generally a large amount of cases in which different advertising orders include a same advertising image or similar advertising images. There may be even up to thousands of different advertising orders which include a same advertising image or similar advertising images. However, in practice, redundant information carried by the different advertising orders which include a same advertising image or similar advertising images is generally different. Hence it is caused that the advertising orders are distributed sparsely, and reducing the effect of delivering advertising orders.

SUMMARY

According to the embodiments of the present disclosure, it is provided an image clustering method, an image clustering system, and an image clustering server.

According to the first aspect of the embodiments of the present disclosure, it is provided an image clustering method, including:

extracting a global scene semantic (GIST) feature of a first image and a GIST feature of a second image;

obtaining an image fingerprint of the first image based on the GIST feature of the first image, and obtaining an image fingerprint of the second image based on the GIST feature of the second image;

calculating a similarity between the first image and the second image, based on the image fingerprint of the first image and the image fingerprint of the second image; and determining whether the similarity between the first image and the second image is larger than a predetermined similarity threshold, and classifying the first image and the second image as a same category of image in the case that the similarity between the first image and the second image is larger than the predetermined similarity threshold.

According to the second aspect of the embodiments of the present disclosure, it is provided an image clustering system, which includes a processor and memory configured to store units including:

a feature extraction unit, programmed to extract a global scene semantic (GIST) feature of a first image and a GIST feature of a second image;

a fingerprint obtaining unit, programmed to obtain an image fingerprint of the first image based on the GIST feature of the first image, and obtain an image fingerprint of the second image based on the GIST feature of the second image;

a similarity calculation unit, programmed to calculate a similarity between the first image and the second image, based on the image fingerprint of the first image and the image fingerprint of the second image;

a first determining unit, programmed to determine whether the similarity between the first image and the second image is larger than a predetermined similarity threshold; and a storage unit, programmed to classify the first image and the second image as the same category of image, in the case that the similarity between the first image and the second image is larger than the determined similarity threshold.

According to the third aspect of the embodiments of the present disclosure, it is provided an image clustering server, including a processor and memory having instructions stored thereon, the instructions, when executed by the processor, cause the processor to perform operations including:

extracting a global scene semantic (GIST) feature of a first image and a GIST feature of a second image;

obtaining an image fingerprint of the first image based on the GIST feature of the first image, and obtaining an image fingerprint of the second image based on the GIST feature of the second image;

calculating a similarity between the first image and the second image, based on the image fingerprint of the first image and the image fingerprint of the second image; and determining whether the similarity between the first image and the second image is larger than a predetermined similarity threshold, and classifying the first image and the second image as a same category of image in the case that the similarity between the first image and the second image is larger than the predetermined similarity threshold.

According to the fourth aspect of the embodiments of the present disclosure, it is provided a non-transient computer-readable storage medium storing computer executable instructions which, when run by a computer, cause the following steps to be executed:

extracting a global scene semantic (GIST) feature of a first image and a GIST feature of a second image;

obtaining an image fingerprint of the first image based on the GIST feature of the first image, and obtaining an image fingerprint of the second image based on the GIST feature of the second image;

calculating a similarity between the first image and the second image, based on the image fingerprint of the first image and the image fingerprint of the second image; and determining whether the similarity between the first image and the second image is larger than a predetermined similarity threshold, and classifying the first image and the second image as a same category of image in the case that the similarity between the first image and the second image is larger than the predetermined similarity threshold.

DETAILED DESCRIPTION OF THE EMBODIMENTS

The technical solution according to the embodiments of the present invention will be described clearly and completely as follows in conjunction with the accompany drawings in the embodiments of the present invention. It is obvious that the described embodiments are only a few of the embodiments according to the present invention. All the other embodiments obtained by those skilled in the art based on the embodiments in the present invention without any creative work belong to the scope of the present invention.

Figure 1:
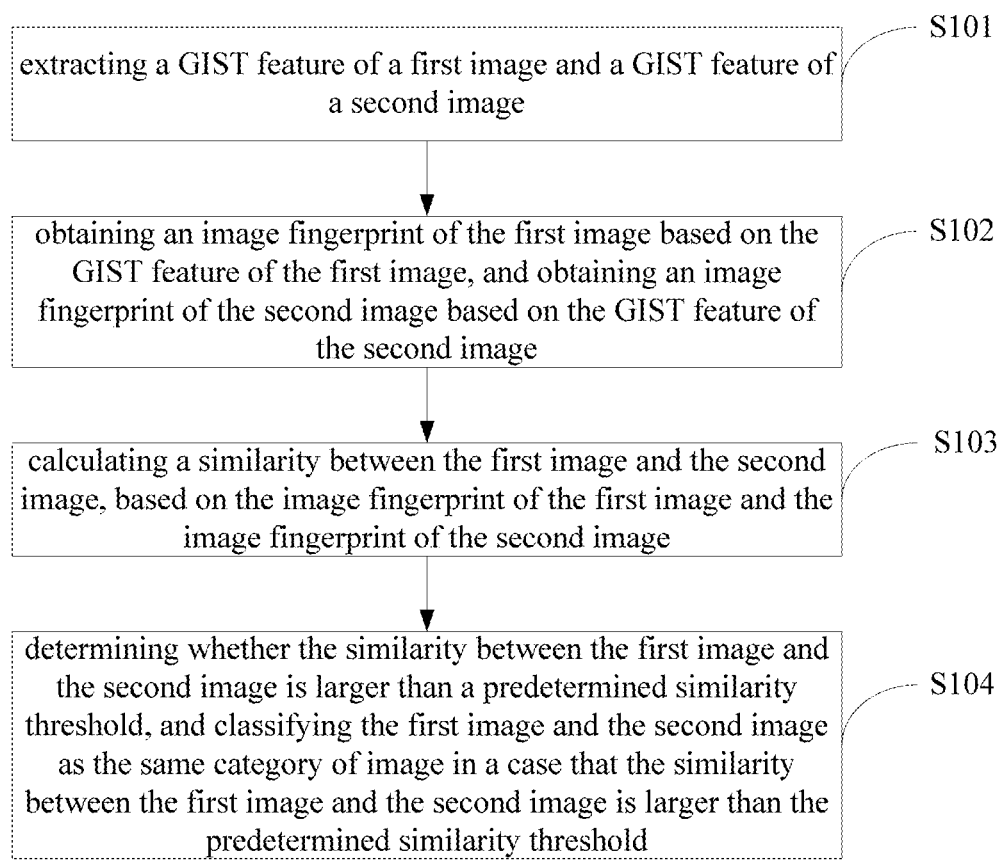
FIG. 1 is a flowchart of an image clustering method according to an embodiment of the present disclosure.

According to an embodiment of the present disclosure, it is provided an image clustering method which may be applied to a device such as a server. As shown in FIG. 1, the method may include steps S101 to S104:

Step S101 may include extracting a global scene semantic (GIST) feature of a first image and a GIST feature of a second image;

Step S102 may include obtaining an image fingerprint of the first image based on the GIST feature of the first image, and obtaining an image fingerprint of the second image based on the GIST feature of the second image;

Step S103 may include calculating a similarity between the first image and the second image, based on the image fingerprint of the first image and the image fingerprint of the second image; and Step S104 may include determining whether the similarity between the first image and the second image is larger than a predetermined similarity threshold, and classifying the first image and the second image as the same category of image in a case that the similarity between the first image and the second image is larger than the predetermined similarity threshold.

According to an embodiment of the present disclosure, it is further provided another image clustering method. The method may be applied to a server which performs an advertising delivery, for performing a fast clustering on different advertising orders which include a same advertising image or similar advertising images. Thereby a delivery effect of the advertising order is improved.

Figure 2:
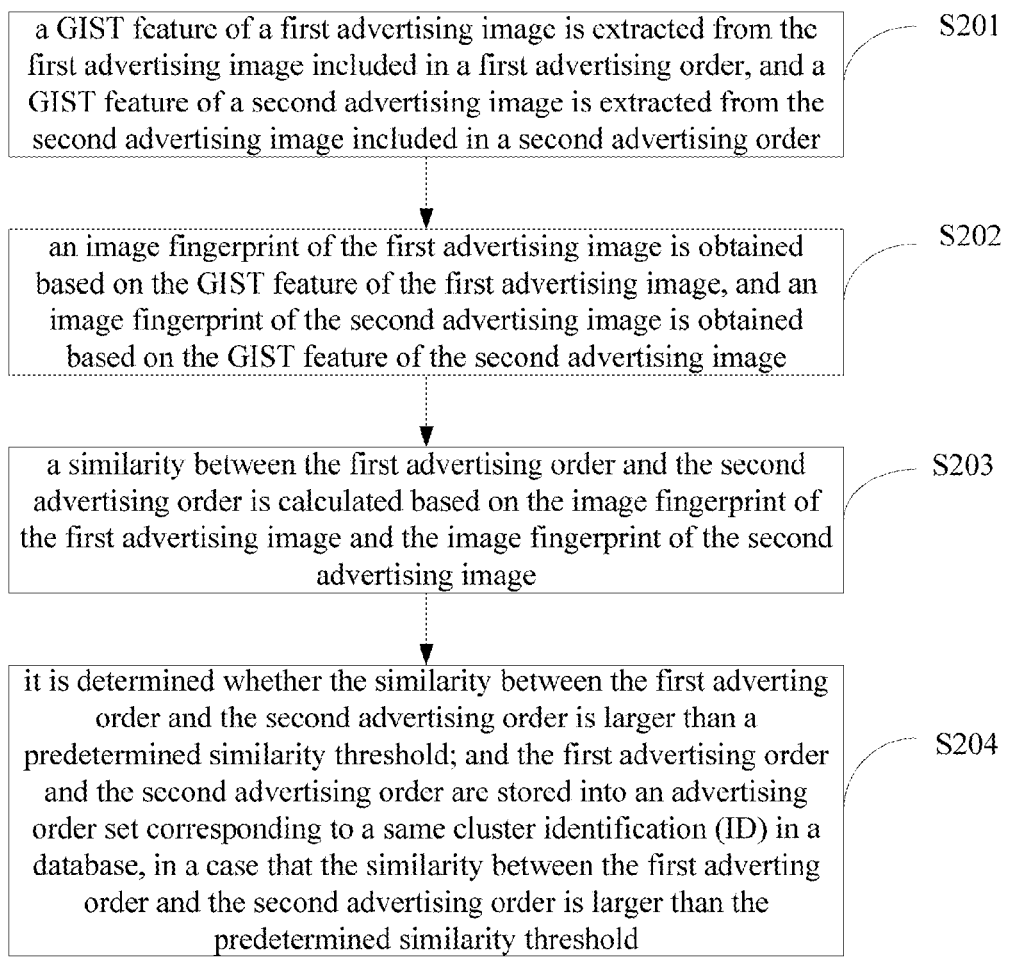
FIG. 2 is a flowchart of another image clustering method according to an embodiment of the present disclosure.

Referring to FIG. 2 which is a flowchart of an image clustering method provided according to an embodiment of the present disclosure. As shown in FIG. 2, the image clustering method may include steps S201 to S204.

In step S201, a GIST feature of a first advertising image is extracted from the first advertising image included in a first advertising order, and a GIST feature of a second advertising image is extracted from the second advertising image included in a second advertising order.

In the embodiment of the present disclosure, the GIST feature of the first advertising image and that of the second advertising image may be extracted from the first advertising order and the second advertising order by the server.

In the embodiment of the present disclosure, the GIST feature refers to a description operator of a global feature of an image, which may describe five types of space envelopes including naturalness, openness, roughness, expansion and ruggedness, and is used in scene recognition and searching a similarity between advertising images.

In the embodiment of the present disclosure, the advertising order in step S201 may be a delivered advertising order, or an advertising order to be delivered, and is not limited in the embodiment of the present disclosure.

In step S202, an image fingerprint of the first advertising image is obtained based on the GIST feature of the first advertising image, and an image fingerprint of the second advertising image is obtained based on the GIST feature of the second advertising image.

In the embodiment of the present disclosure, the server may obtain the image fingerprint of the advertising image based on the GIST feature of the advertising image and in conjunction with a local sensitive hashing (LSH) algorithm.

Figure 3:
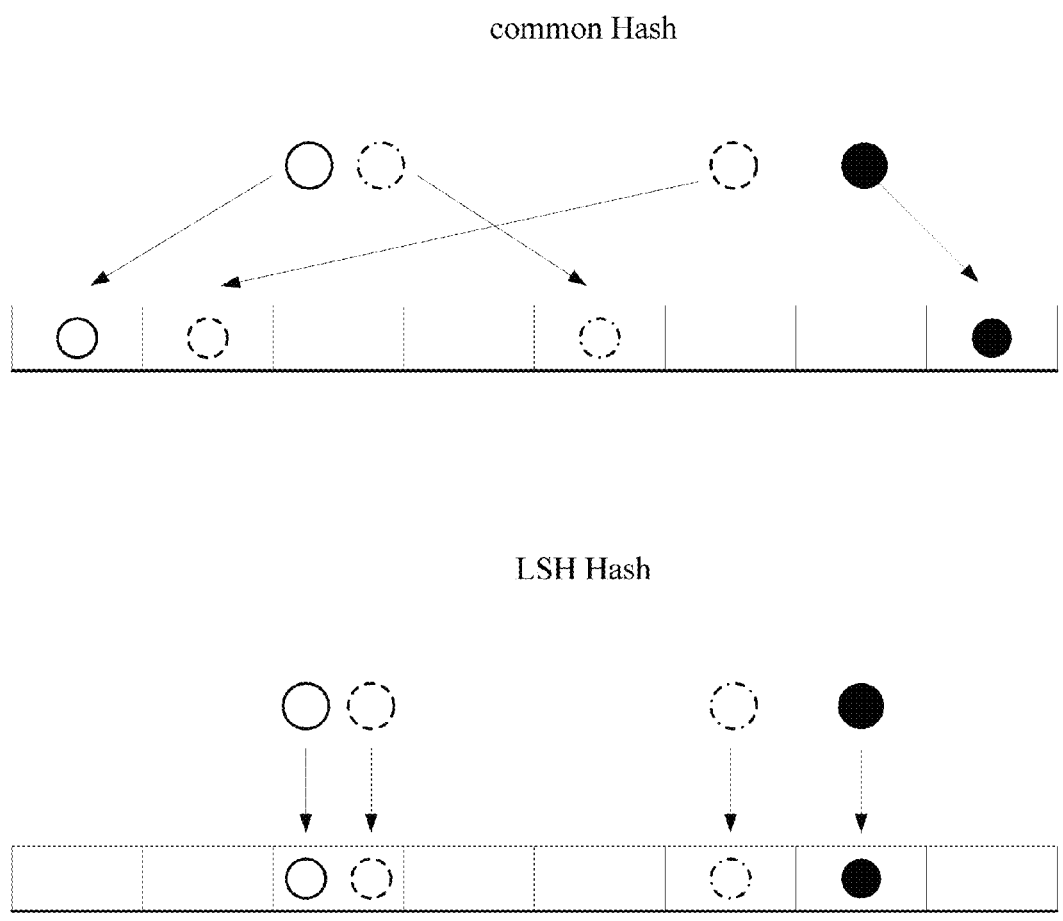
FIG. 3 is a diagram of a comparison between effects when the GIST feature clusterings are respectively performed based on a common Hash algorithm and based on a LSH algorithm, according to an embodiment of the present disclosure.

In the embodiment of the present disclosure, the GIST features may be clustered better with the LSH algorithm than with a common Hash algorithm. As shown in FIG. 3, dots represent the same or similar GIST features in the advertising images. The GIST feature may be clustered better with the LSH algorithm than with a common Hash algorithm. Thereby, it may facilitate obtaining the image fingerprint of the advertising images, by using the GIST feature of the advertising images and in conjunction with the LSH algorithm.

In the embodiment of the present disclosure, the server may obtain the image fingerprint of the advertising image based on a SimHash algorithm in the LSH algorithm and the GIST feature of the advertising image. As an effective dimension reduction technology in the LSH algorithm, according to the SimHash algorithm, a high-dimensional vector may be mapped into a fingerprint with a small number of bits, and a Hamming similarity relationship between original features may be reserved. A process for obtaining the image fingerprint of the advertising image based on the SimHash algorithm in the LSH algorithm and the GIST feature of the advertising image includes steps as follows.

In step S2021, an f-dimensional GIST feature vector, V, is initialized as 0, and an f-bit binary S is initialized as 0.

In step S2022, for each dimension of GIST feature, an f-bit signature b is generated for the feature with a conventional hash algorithm. If an i-th bit of b is 1, the i-th element of V is added with a weight of the dimension of GIST feature; if the i-th bit of b is not 1, the weight of the dimension of GIST feature is subtracted from the i-th element of V, where $1 \leq i \leq f$.

In step S2023, the i-th bit of S is 1 if the i-th element of V is larger than 0, and the i-th bit of S is 0 if the i-th element of V is not larger than 0.

In step 2024, S is output as an image fingerprint of the advertising image.

Figure 4:
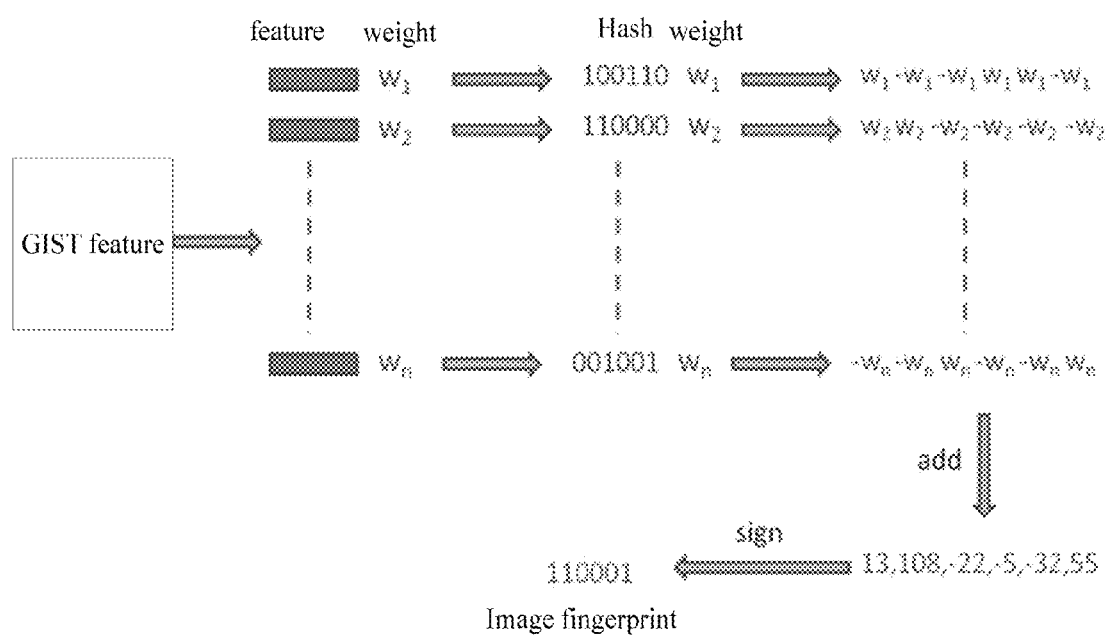
FIG. 4 is a schematic diagram of a process for acquiring an image fingerprint of an advertising image based on a GIST feature of the advertising image and a SimHash algorithm according to an embodiment of the present disclosure.

As shown in FIG. 4, for each dimension of GIST feature, a 6 bits signature b (such as 100110) may be generated with a conventional hash algorithm, and a calculation may be performed with the signatures b(s) generated with the hash algorithm and weights. Finally, a 6 bits image fingerprint 110001 may be output.

In step S203, a similarity between the first advertising order and the second advertising order is calculated based on the image fingerprint of the first advertising image and the image fingerprint of the second advertising image.

In the embodiment of the present disclosure, the server may calculate the similarity between the first advertising order and the second advertising order based on the image fingerprint of the first advertising image and the image fingerprint of the second advertising image.

In the embodiment of the present disclosure, based on the image fingerprints of the first advertising image and the second adverting image, the server may calculate the number of bits on which bit-values of the image fingerprints of the two advertising images are different, as a Hamming similarity between the two advertising orders.

For example, if there are n (n is an integer and larger than or equal to 1) corresponding bits on which the bit-values of the image fingerprints of the two advertising images are different, the Hamming similarity between the two advertising orders is n.

In step S204, it is determined whether the similarity between the first adverting order and the second advertising order is larger than a predetermined similarity threshold; and the first advertising order and the second advertising order are stored into an advertising order set corresponding to a same cluster identification (ID) in a database, in a case that the similarity between the first advertising order and the second advertising order is larger than the predetermined similarity threshold.

In the embodiment of the present disclosure, the server may determine whether the Hamming similarity between the two advertising orders is larger than the predetermined similarity threshold, and may store the two advertising orders into the advertising order set corresponding to the same cluster ID in the database, if the Hamming similarity between the two advertising orders is larger than the predetermined similarity threshold.

In the embodiment of the present disclosure, in the case that the Hamming similarity between two advertising orders is larger than the predetermined similarity threshold, it is illustrated that the two advertising orders include a same advertising image or similar advertising images. Fast clustering the two advertising orders which include a same advertising image and similar adverting images can be implemented by storing the two advertising orders into the advertising order set corresponding to a same cluster ID in the database. Other advertising order may be delivered according to the delivery path of advertising orders which have been clustered, thereby the delivery effect of advertising orders is improved.

In the method shown in FIG. 2, after the GIST feature of the first advertising image is extracted from the first advertising image included in the first advertising order, and the GIST feature of the second adverting image is extracted from the second adverting image included in the first advertising order, the image fingerprint of the first advertising image may be obtained based on the GIST feature of the first advertising image and the LSH algorithm, and the image fingerprint of the second advertising image may be obtained based on the GIST feature of the second adverting image and the LSH algorithm. Then, the Hamming similarity between the two advertising orders may be calculated based on the image fingerprints of the two advertising images included in the two advertising orders; and the two advertising orders are stored into an advertising order set corresponding to a same cluster ID in a database, in a case that the Hamming similarity between the two advertising orders is larger than the predetermined similarity threshold. In the method shown in FIG. 2, in the case that the Hamming similarity between two advertising orders is larger than the predetermined similarity threshold, it is illustrated that the two advertising orders include a same advertising image or similar advertising images. With the method shown in FIG. 2, fast clustering of the different advertising orders which include a same advertising image or similar advertising images may be implemented, thereby the delivery effect of advertising orders is improved.

Figure 5:
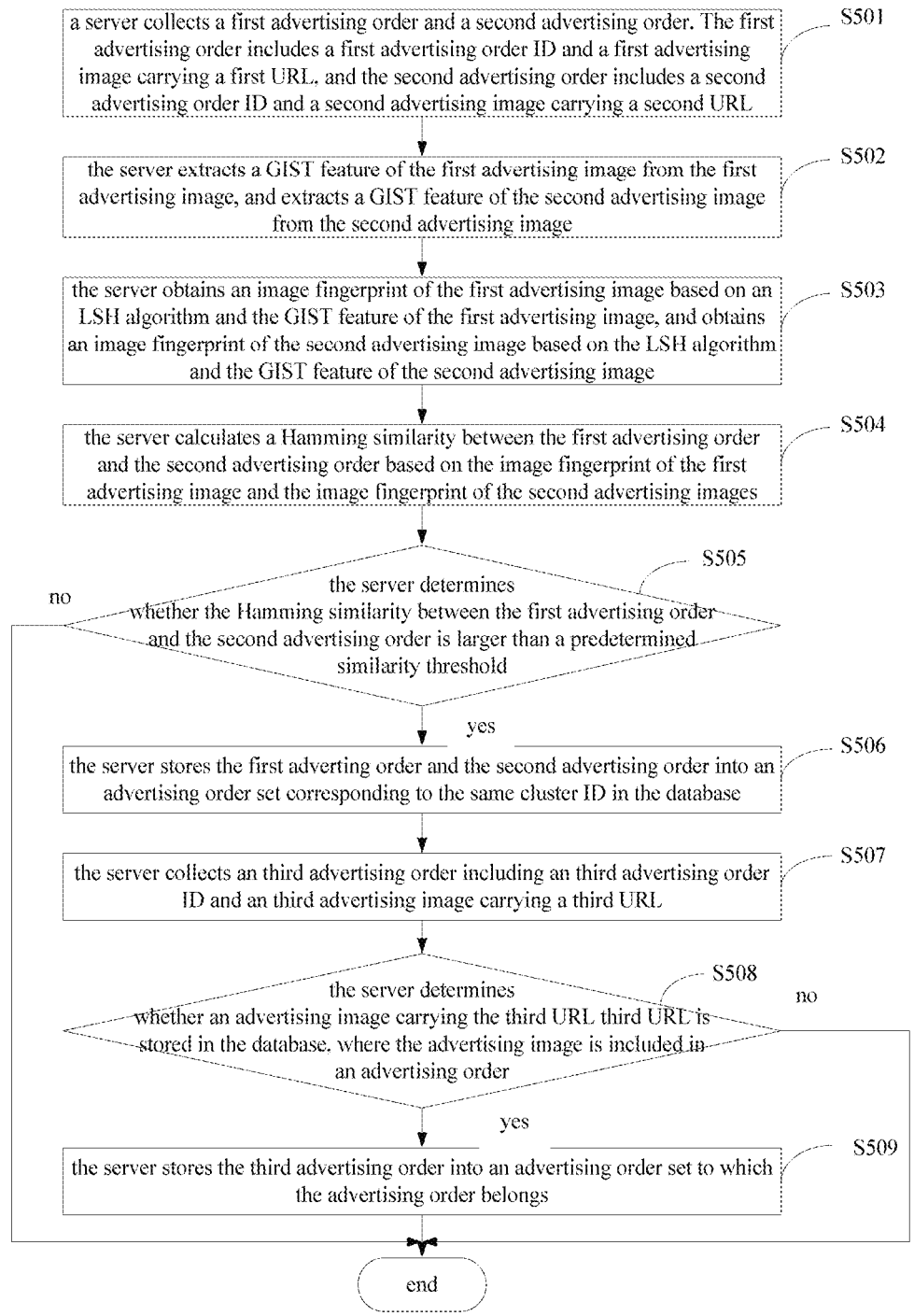
FIG. 5 is a flowchart of another image clustering method according to an embodiment of the present disclosure.

Referring to FIG. 5 which is a flowchart of another image clustering method according to an embodiment of the present disclosure. The image clustering method shown in FIG. 5 may be applied to various servers which perform an advertisement delivery. As shown in FIG. 5, the fast cluster method of the advertising order may include steps S501 to S509.

In step S501, a server collects a first advertising order and a second advertising order. The first advertising order includes a first advertising order ID and a first advertising image carrying a first uniform resource locater (URL), and the second advertising order includes a second advertising order ID and a second advertising image carrying a second URL.

In the embodiment of the present disclosure, the advertising order collected by the server in step S501 may be a delivered advertising order or an advertising order to be delivered, and is not limited in the embodiment of the present disclosure.

In step S502, the server extracts a GIST feature of the first advertising image from the first advertising image, and extracts a GIST feature of the second advertising image from the second advertising image.

In the embodiment of the present disclosure, the GIST feature refers to a description operator of a global feature of an image. The description operator may describe five types of space envelopes including naturalness, openness, roughness, expansion and ruggedness, and is used in scene recognition and searching a similarity between advertising images.

In step S503, the server obtains an image fingerprint of the first advertising image based on an LSH algorithm and the GIST feature of the first advertising image, and obtains an image fingerprint of the second advertising image based on the LSH algorithm and the GIST feature of the second advertising image.

In the embodiment of the present disclosure, the server may obtain the image fingerprint of the advertising image based on a SimHash algorithm in the LSH algorithm and the GIST feature of the advertising image. As an effective dimension reduction technology in the LSH algorithm, according to the SimHash algorithm, a high-dimensional vector may be mapped into a fingerprint with a small number of bits, and a Hamming similarity relationship between original features may be reserved. A process for obtaining the image fingerprint of the advertising image based on the SimHash algorithm in the LSH algorithm and the GIST feature of the advertising image includes steps as follows.

In step S5031, an f-dimensional vector, V, is initialized as 0, and an f-bit binary S is initialized as 0.

In step S5032, for each dimension of GIST feature, an f-bit signature b is generated for the feature with a conventional hash algorithm. If an i-th bit of b is 1, the i-th element of V is added with a weight of the dimension of GIST feature; if the i-th bit of b is not 1, the weight of the dimension of GIST feature is subtracted from the i-th element of V, where $1 \leq i \leq f$.

In step S5033, the i-th bit of S is 1 if the i-th element of V is larger than 0; and the i-th bit of S is 0 if the i-th element of V is not larger than 0.

In step 5034, S is output as an image fingerprint of the advertising image.

In the embodiment of the present disclosure, the advantages of the method in which the SimHash algorithm is used are as follows.

A. the clustering is fast since it is completed by scanning data once;

B. the method is fit for a distributed environment since it is unnecessary to specify the number of cluster centers; and C. the generated image fingerprint represents the similarity between two advertising orders, so that it is possible to perform a further cluster compressing on the image fingerprints by using a MinHash algorithm.

In step S504, the server calculates a Hamming similarity between the first advertising order and the second advertising order based on the image fingerprint of the first advertising image and the image fingerprint of the second advertising images.

In the embodiment of the present disclosure, based on the image fingerprint of the first advertising image and the second adverting image, the server may calculate the number of bits, on which bit-values of the image fingerprints of the two advertising images are different, as a Hamming similarity between the two advertising orders.

For example, if there are n (n is an integer and larger than or equal to 1) corresponding bits on which the bit-values of the image fingerprints of the two advertising images are different, the Hamming similarity between the two advertising orders is n.

In step S505, the server determines whether the Hamming similarity between the first advertising order and the second advertising order is larger than a predetermined similarity threshold. Step S506 is performed if the Hamming similarity between the first advertising order and the second advertising order is larger than a predetermined similarity threshold; and the flow is ended if the Hamming similarity between the first advertising order and the second advertising order is not larger than the predetermined similarity threshold.

In the embodiment of the present disclosure, in the case that the Hamming similarity between two advertising orders is larger than the predetermined similarity threshold, it is illustrated that the two advertising orders include a same advertising image or similar advertising images.

In the embodiment of the present disclosure, the predetermined similarity threshold may be set as needed, and is not limited in the embodiment of the present disclosure.

In step S506, the server stores the first adverting order and the second advertising order into an advertising order set corresponding to the same cluster ID in the database.

In the embodiment of the present disclosure, fast clustering the two advertising orders which include a same advertising image and similar advertising images can be implemented by storing the two advertising orders into the advertising order set corresponding to a same cluster ID in the database. Other advertising order may be delivered according to the delivery path of advertising orders which have been clustered, thereby the delivery effect of advertising orders is improved.

In step S507, the server collects an third advertising order including an third advertising order ID and an third advertising image carrying a third URL.

In the embodiment of the present application, the third advertising order may be an advertising order to be delivered.

In step S508, the server determines whether an advertising image carrying the third URL third URL is stored in the database, where the advertising image is included in an advertising order. Step S509 is performed in the case that an advertising image carrying the third URL is stored in the database; and the flow is ended if there is no an advertising image carrying the third URL stored in the database.

In step S509, the server stores the third advertising order into an advertising order set to which the advertising order belongs.

In the method shown in FIG. 5, in the case that the Hamming similarity between the first advertising order and the second advertising order is larger than the predetermined similarity threshold, it is illustrated that the two advertising orders include a same advertising image or similar advertising images. With the method shown in FIG. 5, fast clustering of different advertising orders which include a same advertising image or similar advertising images may be implemented, thereby the delivery effect of advertising orders is improved.

In the embodiment of the present disclosure, the method shown in FIGS. 2 and 3 may be performed in a way that a calculation layer and a collection layer operate separately. Specifically, the steps of collecting advertising orders, calculating similarity of advertising orders, and clustering advertising orders are performed in the calculation layer; and the steps of collecting advertising orders, and updating advertising order sets stored in the database are performed in the collection layer. Hence, a real-time of the system is ensured effectively and an error rate of the system is reduced.

Figure 6:
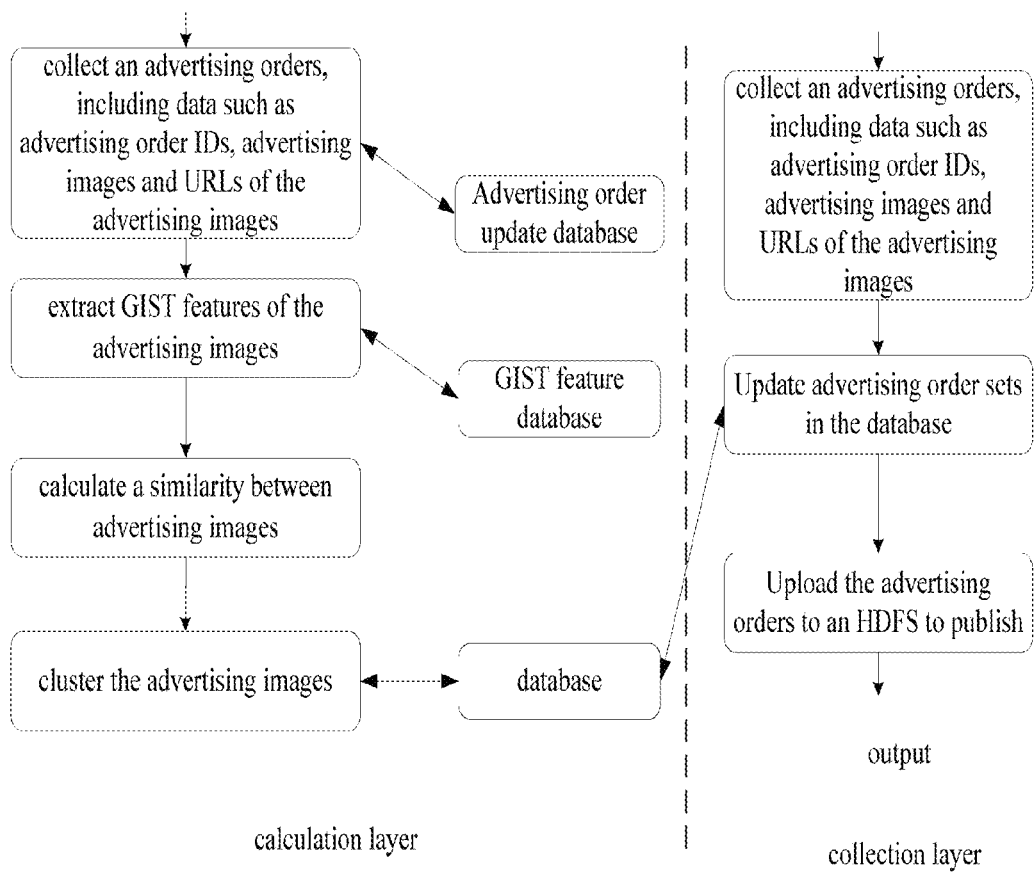
FIG. 6 is a flowchart of a method for performing a fast clustering on an advertising order in which a calculation layer and a collection layer operate separately according to an embodiment of the present disclosure.

Referring to FIG. 6 which is a flowchart of a method for clustering advertising orders in which the calculation layer and the collection layer operate separately. As shown in FIG. 6, the steps of collecting advertising orders, extracting GIST features of advertising orders, calculating similarity of advertising orders, and clustering advertising orders are performed in the calculation layer. Furthermore, as shown in FIG. 6, the steps of collecting an advertising order from an advertising order update database, and storing a GIST feature of an advertising image in a GIST feature database may be performed in the calculation layer. The steps of collecting advertising orders, and updating advertising order sets stored in the database are performed in the collection layer. Furthermore, the step of uploading an advertising order to a distributed file system (HDFS) to publish, according to a delivery path of an advertising order set to which the advertising order belongs, may be performed in the collection layer, thus the delivery effect of the collected advertising order may be improved.

Figure 7:
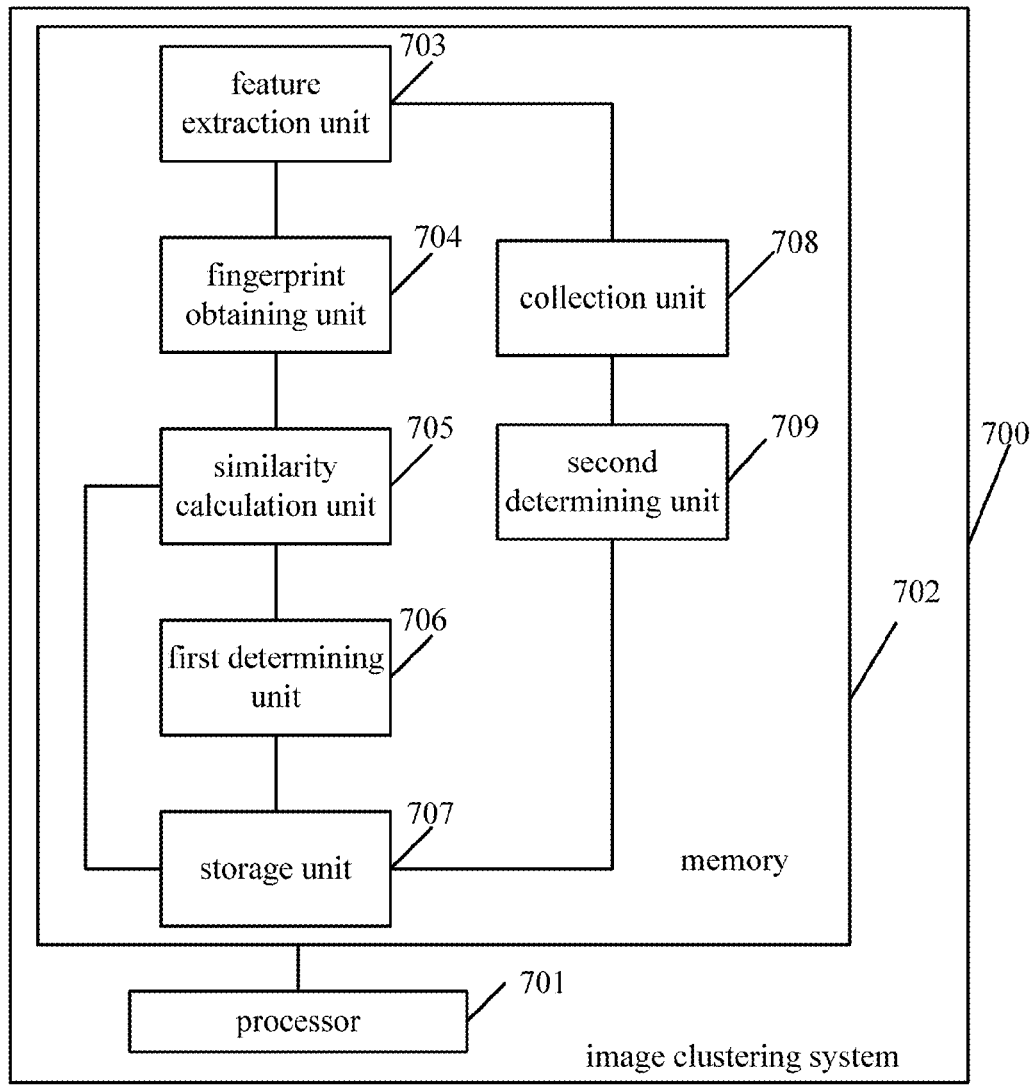
FIG. 7 is a schematic structural diagram of an image clustering system according to an embodiment of the present disclosure.

Referring to FIG. 7 which is a schematic structural diagram of an image clustering system according to an embodiment of the present disclosure. As shown in FIG. 7, the image clustering system 700 includes one or more processors 701 and memory 702 configured to store units including:

a feature extraction unit 703, programmed to extract a global scene semantic (GIST) feature of a first image and a GIST feature of a second image;

a fingerprint obtaining unit 704, programmed to obtain an image fingerprint of the first image based on the GIST feature of the first image, and obtain an image fingerprint of the second image based on the GIST feature of the second image;

a similarity calculation unit 705, programmed to calculate a similarity between the first image and the second image, based on the image fingerprint of the first image and the image fingerprint of the second image;

a first determining unit 706, programmed to determine whether the similarity between the first image and the second image is larger than a predetermined similarity threshold; and a storage unit 707, programmed to classify the first image and the second image as a same category of image, in a case that the similarity between the first image and the second image is determined as being larger than the predetermined similarity threshold in the first determining unit 706.

The image clustering device shown in FIG. 7 is applied to a server which performs an advertisement delivery, for implementing a fast clustering on different advertising orders which include a same advertising image or advertising images, thereby the delivery effect of the advertising order is improved. Specifically:

the feature extraction unit 703 is programmed to extract a GIST feature of a first advertising image from the first advertising image included in a first advertising order and extract a GIST feature of a second advertising image from the second advertising image included in a second advertising order;

the fingerprint obtaining unit 704 is programmed to obtain an image fingerprint of the first advertising image based on the GIST feature of the first advertising image, and obtain an image fingerprint of the second advertising image based on the GIST feature of the second advertising image;

the similarity calculation unit 705 is programmed to calculate a similarity between the first advertising order and the second advertising order based on the image fingerprint of the first advertising image and the image fingerprint of the second advertising image;

the first determining unit 706 is programmed to determine whether the similarity between the first adverting order and the second advertising order is larger than a predetermined similarity threshold;

the storage unit 707 is programmed to store the first advertising order and the second advertising order into an advertising order set corresponding to a same cluster identification (ID) in a database, in a case that the similarity between the first advertising order and the second advertising order is larger than the predetermined similarity threshold in the first determining unit 706.

In the embodiment of the present disclosure, the fingerprint acquisition unit 704 may be programmed to obtain the image fingerprint of the first advertising image, based on the GIST feature of the first image and in conjunction with a local sensitive hash (LSH) algorithm, and obtain the image fingerprint of the second advertising image, based on the GIST feature of the second image and in conjunction with the LSH algorithm.

In an embodiment, the memory 702 included in the image clustering system 700 shown in FIG. 7 may further include:

a collection unit 708, programmed to collect the first advertising order and the second advertising order before the feature extraction unit 703 extracts the GIST feature of the first advertising image from the first advertising image and extracts the GIST feature of the second advertising image from the second advertising image, where the first advertising order includes a first advertising order identification, and the first advertising image carries a first uniform resource locater (URL); the second advertising order includes a second advertising order identification, and the second advertising image carries a second URL.

Correspondingly, the feature extraction unit 703 may extract the GIST feature of the first advertising image from the first advertising image collected by the collection unit 708, extracts the GIST feature of the second advertising image from the second advertising image collected by the collection unit 708.

In an embodiment, the similarity calculation unit 705 may be programmed to, based on the image fingerprint of the first advertising image and the image fingerprint of the second advertising image, calculate the number of bits on which the bit-values of the image fingerprint of the first advertising image and the image fingerprint of the second advertising image are different, as a Hamming similarity between the first advertising order and second advertising order.

In an embodiment, the collection unit 708 is further programmed to collect a third advertising order which includes a third advertising order identification and a third advertising image carrying a third URL.

Correspondingly, the memory 702 included in the image clustering system 700 shown in FIG. 7 may further include:

a second determining unit 709, programmed to determine whether an advertising image carrying the third URL is stored in the database, where the advertising image is included in an advertising order.

Correspondingly, the storage unit 707 is further programmed to, in the case that the second determining unit 709 determines that an advertising image carrying the third URL is stored in the database, store the third advertising order into an advertising order set to which the advertising order belongs.

In the embodiment of the present disclosure, the LSH algorithm includes a SimHash algorithm, and the advantages of the method in which the SimHash algorithm is used are as follows.

A. the clustering is fast since it is completed by scanning data once;

B. the method is fit for a distributed environment since it is unnecessary to specify the number of cluster centers; and C. the generated image fingerprint represents the similarity between two advertising orders, so that it is possible to perform a further cluster compressing on the image fingerprints by using a MinHash algorithm.

In the system shown in FIG. 7, in the case that the Hamming similarity between two advertising orders is larger than the predetermined similarity threshold, it is illustrated that the two advertising orders include a same advertising image or similar advertising images. With the system shown in FIG. 8, fast clustering of the different advertising orders which include a same advertising image or similar advertising images may be implemented, thereby the delivery effect of advertising order is improved.

Figure 8:
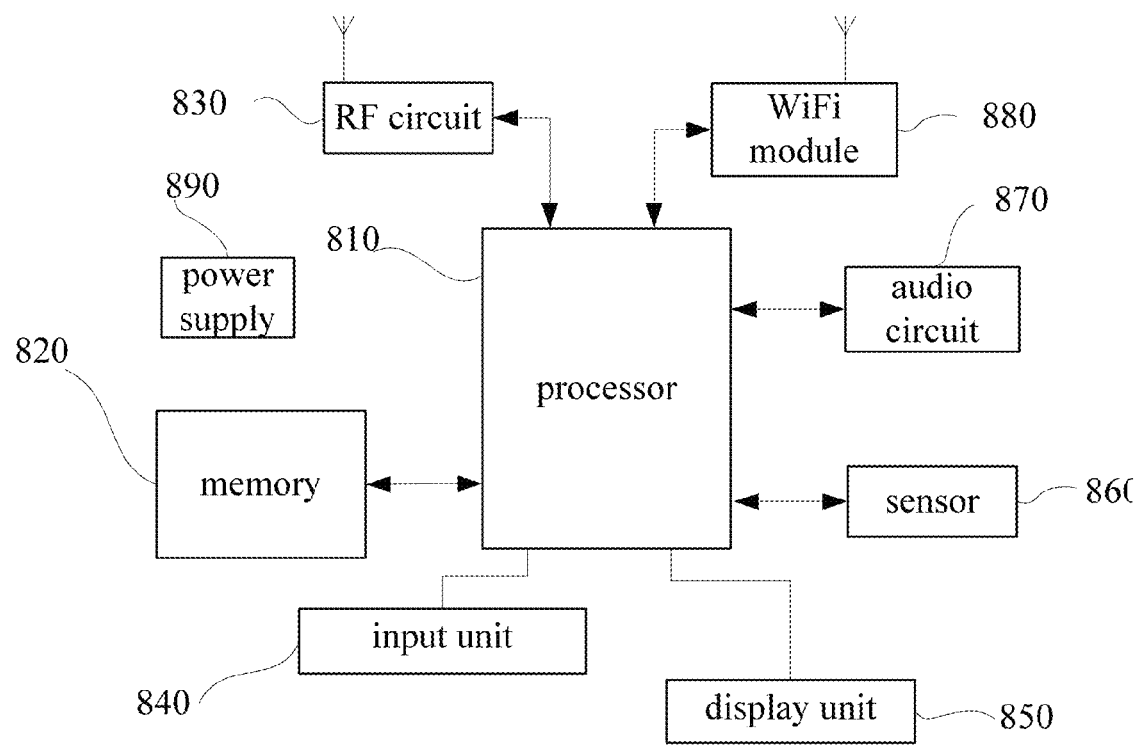
FIG. 8 is a schematic structural diagram of an image clustering server according to an embodiment of the present disclosure.

According to an embodiment of the present disclosure, it is further provided an image clustering server, as shown in FIG. 8, the server includes one or more processors 810 and memory 820 having instructions stored thereon. The server may further includes a radio frequency (RF) circuit 830, an input unit 840, a display unit 850, a sensor 860, an audio circuit 870, a wireless fidelity (WiFi) module 880, and a power supply 890. The instructions, when executed by the one or more processors, cause the processors to perform operations including:

extracting a global scene semantic (GIST) feature of a first image and a GIST feature of a second image;

obtaining an image fingerprint of the first image based on the GIST feature of the first image, and obtaining an image fingerprint of the second image based on the GIST feature of the second image;

calculating a similarity between the first image and the second image, based on the image fingerprint of the first image and the image fingerprint of the second image; and determining whether the similarity between the first image and the second image is larger than a predetermined similarity threshold, and classifying the first image and the second image as the same category of image in a case that the similarity between the first image and the second image is larger than the predetermined similarity threshold.

In the case that the server is for delivering an advertisement, the processors may perform operations including:

extracting a GIST feature of a first advertising image from the first advertising image included in a first advertising order and extracting a GIST feature of a second advertising image from the second advertising image included in a second advertising order;

obtaining an image fingerprint of the first advertising image based on the GIST feature of the first advertising image, and obtaining an image fingerprint of the second advertising image based on the GIST feature of the second advertising image;

calculating a similarity between the first advertising order and the second advertising order based on the image fingerprint of the first advertising image and the image fingerprint of the second advertising image; and determining whether the similarity between the first advertising order and the second advertising order is larger than a predetermined similarity threshold; and storing the first advertising order and the second advertising order into an advertising order set corresponding to a same cluster identification (ID) in a database, in a case that the similarity between the first advertising order and the second advertising order is larger than the predetermined similarity threshold.

In an embodiment, before extracting the GIST feature of the first advertising image from the first advertising image, and the GIST feature of the second advertising image from the second advertising image, the processors included in the server may further perform operations including:

collecting the first advertising order and the second advertising order, where the first advertising order includes a first advertising order identification and the first advertising image carrying a first uniform resource locator (URL), and the second advertising order includes a second advertising order identification and the second advertising image carrying a second URL.

In an embodiment, the process of the server obtaining the image fingerprint of the first advertising image based on the GIST feature of the first advertising image and obtaining the image fingerprint of the second advertising image based on the GIST feature of the second advertising image may include:

obtaining the image fingerprint of the first advertising image, based on the GIST feature of the first advertising image and in conjunction with a local sensitive hashing (LSH) algorithm, and obtaining the image fingerprint of the second advertising image, based on the GIST feature of the second advertising image and in conjunction with the LSH algorithm.

In an embodiment, the process of the server calculating the similarity between the first advertising order and the second advertising order based on the image fingerprint of the first advertising image and the image fingerprint of the second advertising image may include:

calculating the number of bits on which bit-values of the image fingerprint of the first advertising image and the image fingerprint of the second advertising image are different based on the image fingerprint of the first advertising image and the image fingerprint of the second advertising image, as a Hamming similarity between the first advertising order and the second advertising order.

In an embodiment, the processors included in the server may perform operations including:

collecting an third advertising order including an third advertising order identification and a third advertising image carrying a third URL;

determining whether an advertising image carrying the third URL is stored in the database, where the advertising image is included in an advertising order; and in the case that it is determined that an advertising image carrying the third URL is stored in the database, storing the third advertising order into an advertising order set to which the advertising order belongs.

In the above server, in the case that the Hamming similarity between two advertising orders is larger than a predetermined similarity threshold, it is illustrated that the two advertising orders include a same advertising image or similar advertising images. With the above server, fast clustering of the different advertising orders which include a same advertising image or similar advertising images may be implemented, thereby the delivery effect of advertising order is improved.

It should be understood by those skilled in the art that, all or parts of the steps in the above method may be completed in a way that a program instructs hardware associated with the server. The program may be stored in a computer readable storage medium of a trading platform server, such as a flash drive, a Read-Only Memory (ROM), a Random Access Memory (RAM), a magnetic disk or an optical disk.

In the above, the advertising order fast clustering method and system, and the system according to the embodiments of the present disclosure are described in detail. Specific examples are applied herein to set forth the principle and the embodiments of the present disclosure. The above illustrations of the embodiments are only used to help to understand the method of the present disclosure and the core concept thereof. Moreover, for those skilled in the art, changes may be made to both the embodiments and application range in light of the concept of the present disclosure. In summary, the specification should not be construed as limiting the scope of the present disclosure.

The invention claimed is:

1. An image clustering method, comprising:
    extracting a Global Scene Semantic (GIST) feature of a first image and a GIST feature of a second image, wherein the first image is a first advertising image comprised in a first advertising order and the second image is a second advertising image comprised in a second advertising order;
    obtaining an image fingerprint of the first image based on the GIST feature of the first image, and obtaining an image fingerprint of the second image based on the GIST feature of the second image, wherein the obtaining an image fingerprint of the first image based on the GIST feature of the first image and obtaining an image fingerprint of the second image based on the GIST feature of the second image comprises:
  obtaining the image fingerprint of the first advertising image, based on the GIST feature of the first advertising image and a SimHash algorithm in a Local Sensitive Hashing (LSH) algorithm, and
  obtaining the image fingerprint of the second advertising image, based on the GIST feature of the second advertising image and the SimHash algorithm in the LSH algorithm;
calculating a similarity between the first image and the second image, based on the image fingerprint of the first image and the image fingerprint of the second image; and
determining whether the similarity between the first image and the second image is larger than a predetermined similarity threshold, and classifying the first image and the second image as a same category of image in a case that the similarity between the first image and the second image is larger than the predetermined similarity threshold.

2. The method according to claim 1, further comprising:
collecting the first advertising order and the second advertising order, wherein the first advertising order comprises a first advertising order identification and the first advertising image carrying a first Uniform Resource Locater (URL), and the second advertising order comprises a second advertising order identification and the second advertising image carrying a second URL.

3. The method according to claim 1, further comprising:
storing the first advertising order and the second advertising order into an advertising order set corresponding to a same cluster identification in a database, in a case that the similarity between the first advertising image and the second advertising image is larger than the predetermined similarity threshold.

4. The method according to claim 3, further comprising:
collecting a third advertising order which comprises a third advertising order identification and a third advertising image carrying a third URL;
determining whether an advertising image carrying the third URL is stored in the database, wherein the advertising image is included in an advertising order; and
in the case that the advertising image carrying the third URL is stored in the database, storing the third advertising order into an advertising order set to which the advertising order belongs.

5. The method according to claim 1, wherein the obtaining the image fingerprint of the advertising image based on the SimHash algorithm in the LSH algorithm and the GIST feature of the advertising image comprises:
  initializing an f-dimensional GIST feature vector, V, as 0, and initializing an f-bit binary S as 0;
  generating, for each dimension of GIST feature, an f-bit signature b for the feature with a conventional hash algorithm;
  adding an i-th element of V with a weight of the dimension of GIST feature if an i-th bit of b is 1;
  subtracting the weight of the dimension of GIST feature from the i-th element of V if the i-th bit of b is not 1, wherein $1 \leq i \leq f$; and
  outputting S as an image fingerprint of the advertising image, wherein the i-th bit of S is 1 if the i-th element of V is larger than 0, and the i-th bit of S is 0 if the i-th element of V is not larger than 0.

6. An image clustering system, comprising a processor and memory configured to store units comprising:
  a feature extraction unit, programmed to extract a Global Scene Semantic (GIST) feature of a first image and a GIST feature of a second image, wherein the first image is a first advertising image comprised in a first advertising order and the second image is a second advertising image comprised in a second advertising order;
  a fingerprint obtaining unit, programmed to obtain an image fingerprint of the first image based on the GIST feature of the first image, and obtain an image fingerprint of the second image based on the GIST feature of the second image, wherein the obtaining an image fingerprint of the first image based on the GIST feature of the first image and obtaining an image fingerprint of the second image based on the GIST feature of the second image comprises:
    obtaining the image fingerprint of the first advertising image, based on the GIST feature of the first advertising image and a SimHash algorithm in a Local Sensitive Hashing (LSH) algorithm, and
    obtaining the image fingerprint of the second advertising image, based on the GIST feature of the second advertising image and the SimHash algorithm in the LSH algorithm;
  a similarity calculation unit, programmed to calculate a similarity between the first image and the second image, based on the image fingerprint of the first image and the image fingerprint of the second image;
  a first determining unit, programmed to determine whether the similarity between the first image and the second image is larger than a predetermined similarity threshold; and
  a storage unit, programmed to classify the first image and the second image as a same category of image, in the case that the similarity between the first image and the second image is larger than the predetermined similarity threshold.

7. The system according to claim 6, further comprising:
a collection unit, programmed to collect the first advertising order and the second advertising order, wherein the first advertising order comprises a first advertising order identification and the first advertising image carrying a first Uniform Resource Locater (URL), and the second advertising order comprises a second advertising order identification and the second advertising image carrying a second URL.

8. The system according to claim 7, wherein the storage unit is further programmed to store the first advertising order and the second advertising order into an advertising order set corresponding to the same cluster identification in a database, in the case that the similarity between the first advertising image and the second advertising image is larger than the predetermined similarity threshold.

9. The system according to claim 8, wherein the collection unit is further programmed to collect a third advertising order which comprises a third advertising order identification and a third advertising image carrying a third URL.

10. The system according to claim 9, further comprising a second determining unit, programmed to determine whether an advertising image carrying the third URL is stored in the database, wherein the advertising image is comprised in an advertising order; in the case that the adverting image carrying the third URL is stored in the database, the storage unit stores the third adverting order into an advertising order set to which the adverting order belongs.

11. An image clustering server, comprising a processor and memory having instructions stored thereon, the instructions, when executed by the processor, cause the processor to perform operations including:
 extracting a Global Scene Semantic (GIST) feature of a first image and a GIST feature of a second image, wherein the first image is a first advertising image comprised in a first advertising order and the second image is a second advertising image comprised in a second advertising order;
 obtaining an image fingerprint of the first image based on the GIST feature of the first image, and obtaining an image fingerprint of the second image based on the GIST feature of the second image, wherein the obtaining an image fingerprint of the first image based on the GIST feature of the first image and obtaining an image fingerprint of the second image based on the GIST feature of the second image comprises:
  obtaining the image fingerprint of the first advertising image, based on the GIST feature of the first advertising image and in conjunction with a SimHash algorithm in a Local Sensitive Hashing (LSH) algorithm, and
  obtaining the image fingerprint of the second advertising image, based on the GIST feature of the second advertising image and the SimHash algorithm in the LSH algorithm;
 calculating a similarity between the first image and the second image, based on the image fingerprint of the first image and the image fingerprint of the second image; and
 determining whether the similarity between the first image and the second image is larger than a predetermined similarity threshold, and classifying the first image and the second image as a same category of image in the case that the similarity between the first image and the second image is larger than the predetermined similarity threshold.

12. A non-transient computer-readable storage medium storing computer executable instructions which, when run by a computer, cause the following steps to be executed:
 extracting a Global Scene Semantic (GIST) feature of a first image and a GIST feature of a second image, wherein the first image is a first advertising image comprised in a first advertising order and the second image is a second advertising image comprised in a second advertising order;
 obtaining an image fingerprint of the first image based on the extracted GIST feature of the first image, and obtaining an image fingerprint of the second image based on the extracted GIST feature of the second image, wherein the obtaining an image fingerprint of the first image based on the GIST feature of the first image and obtaining an image fingerprint of the second image based on the GIST feature of the second image comprises:
  obtaining the image fingerprint of the first advertising image, based on the GIST feature of the first advertising image and in conjunction with a SimHash algorithm in a Local Sensitive Hashing (LSH) algorithm, and
  obtaining the image fingerprint of the second advertising image, based on the GIST feature of the second advertising image and the SimHash algorithm in the LSH algorithm;
 calculating a similarity between the first image and the second image, based on the image fingerprint of the first image and the image fingerprint of the second image; and
 determining whether the similarity between the first image and the second image is larger than a predetermined similarity threshold, and classifying the first image and the second image as a same category of image in the case that the similarity between the first image and the second image is larger than the predetermined similarity threshold.

* * * * *